US012625821B2

(12) United States Patent
      Redshaw et al.

(10) Patent No.: US 12,625,821 B2
(45) Date of Patent: *May 12, 2026

(54) CACHE CONTROL TO PRESERVE REGISTER DATA

(71) Applicant: Apple Inc., Cupertino, CA (US)

(72) Inventors: Jonathan M. Redshaw, St. Albans (GB); Winnie W. Yeung, San Jose, CA (US); Benjiman L. Goodman, Austin (CA); David K. Li, Austin, TX (US); Zelin Zhang, San Jose, CA (US); Yoong Chert Foo, London (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/962,158

(22) Filed: Nov. 27, 2024

(65) Prior Publication Data

US 2025/0094357 A1 Mar. 20, 2025

Related U.S. Application Data

(63) Continuation of application No. 18/173,500, filed on Feb. 23, 2023, now Pat. No. 12,182,037.

(51) Int. Cl.
G06F 12/126 (2016.01)
G06F 9/38 (2018.01)
(Continued)

(52) U.S. Cl.
CPC ............ G06F 12/126 (2013.01); G06F 9/382 (2013.01); G06F 12/0811 (2013.01); G06F 12/0891 (2013.01)

(58) Field of Classification Search
None
See application file for complete search history.

(56) References Cited

U.S. PATENT DOCUMENTS

| | | |
|---|---|---|
| 5,481,751 A | 1/1996 | Alpert |
| 5,594,886 A | 1/1997 | Smith et al. |

(Continued)

FOREIGN PATENT DOCUMENTS

WO 2023/239671 A1 12/2023

OTHER PUBLICATIONS

International Search Report and Written Opinion in PCT Appl. No. PCT/US2024/015135 mailed May 27, 2024, 10 pages.

*Primary Examiner* — Kaushikkumar M Patel

(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to eviction control for cache lines that store register data. In some embodiments, memory hierarchy circuitry is configured to provide memory backing for register operand data in one or more cache circuits. Lock circuitry may control a first set of lock indicators for a set of registers for a first thread, including to assert one or more lock indicators for registers that are indicated, by decode circuitry, as being utilized by decoded instructions of the first thread. The lock circuitry may preserve register operand data in the one or more cache circuits, including to prevent eviction of a given cache line from a cache circuit based on an asserted lock indicator. The lock circuitry may clear the first set of lock indicators in response to a reset event. Disclosed techniques may advantageously retain relevant register information in the cache with limited control circuit area.

20 Claims, 10 Drawing Sheets

Decode instructions for execution, where the instruction indicate operations on register operand data
710

Provide memory backing for register operand data in one or more caches
720

Control a first set of lock indicators for a set of registers for a first thread, including to assert one or more lock indicators for registers that are indicated, by the decode circuitry, as being utilized by decoded instructions of the first thread
730

Preserve register operand data in the one or more caches, including preventing eviction of a given cache line from a cache based on an asserted lock indicator, where the asserted lock indicator is for a register for which operand data is stored in the given cache line
740

Clear the first set of lock indicators in response to a reset event
750

(51) Int. Cl.
    *G06F 12/0811*       (2016.01)
    *G06F 12/0891*       (2016.01)

(56)                References Cited

U.S. PATENT DOCUMENTS

| | | |
|---|---|---|
| 9,785,567 B2 | 10/2017 | Havlir et al. |
| 10,127,153 B1 | 11/2018 | Vash et al. |
| 10,275,372 B1 | 4/2019 | Intrater et al. |
| 2007/0124568 A1 | 5/2007 | Kra |
| 2010/0106938 A1 | 4/2010 | Kimura |
| 2012/0144119 A1 | 6/2012 | Serebrin et al. |
| 2012/0144120 A1 | 6/2012 | Serebrin et al. |
| 2015/0058574 A1 | 2/2015 | Meredith et al. |
| 2015/0193903 A1 | 7/2015 | Agarwal et al. |
| 2016/0246728 A1 | 8/2016 | Ron |
| 2018/0095756 A1 | 4/2018 | Hasenplaugh et al. |
| 2018/0173625 A1 | 6/2018 | Moudgill et al. |
| 2019/0079874 A1 | 3/2019 | Guirado et al. |
| 2019/0095203 A1 | 3/2019 | Pediaditaki et al. |
| 2019/0340123 A1 | 11/2019 | Herdrich |
| 2020/0065104 A1* | 2/2020 | Kenney ................. G06F 9/3826 |
| 2020/0356411 A1 | 11/2020 | Kim |
| 2021/0173650 A1 | 6/2021 | Gutierrez |
| 2021/0311997 A1 | 10/2021 | Grocutt et al. |

* cited by examiner

Vertex Data

Processing
Flow 100

Graphics
Unit
150

Receive decoded operand register(s)
510

Update locks of allocating frame
520

Reset
event?
530

No

Yes

Switch allocating frame to draining and a new
frame to allocating
540

Implement fence between operations
corresponding to different frames
550

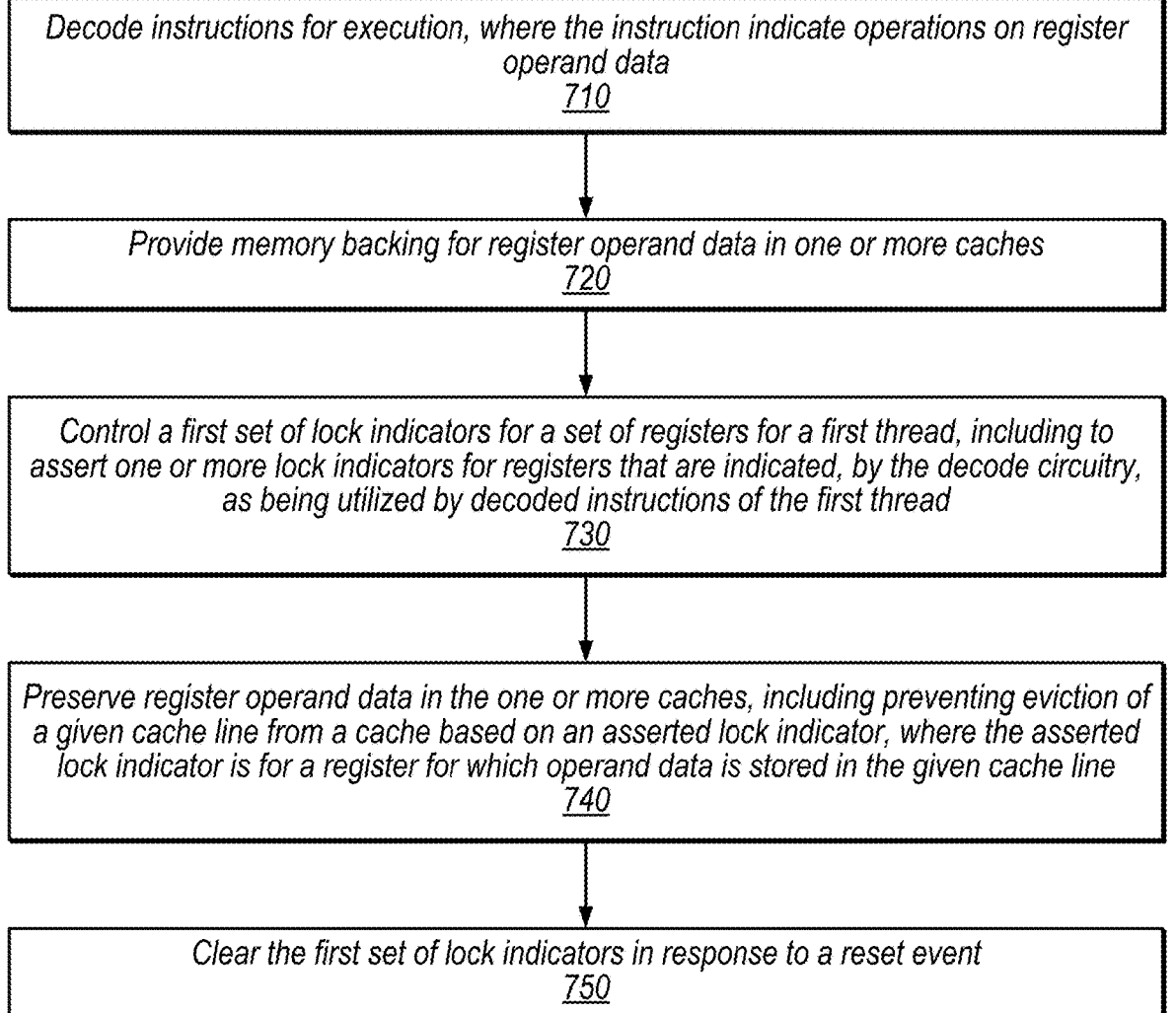

Decode instructions for execution, where the instruction indicate operations on register operand data
710

Provide memory backing for register operand data in one or more caches
720

Control a first set of lock indicators for a set of registers for a first thread, including to assert one or more lock indicators for registers that are indicated, by the decode circuitry, as being utilized by decoded instructions of the first thread
730

Preserve register operand data in the one or more caches, including preventing eviction of a given cache line from a cache based on an asserted lock indicator, where the asserted lock indicator is for a register for which operand data is stored in the given cache line
740

Clear the first set of lock indicators in response to a reset event
750

FIG. 7

CACHE CONTROL TO PRESERVE REGISTER DATA

The present application is a continuation of U.S. application Ser. No. 18/173,500, entitled "Cache Control to Preserve Register Data," filed Feb. 23, 2023, the disclosure of which is incorporated by reference herein in its entirety.

BACKGROUND

Technical Field

This disclosure relates generally to computer processors and more particularly to cache control.

Description of the Related Art

Data management techniques often have substantial impacts on processor performance. Recently, unified memory architectures allow multiple components of a device (e.g., GPU and CPU) to access the same memory at the same locations, in contrast to having reserved portions of RAM for different components. This may advantageously reduce redundancy and data copying.

In this context, data for various graphics processor registers may be memory-backed in a cache/memory hierarchy. Therefore, certain combinations of tasks may cause register data to be evicted from a given cache level. This may have performance consequences if the register data is accessed again after the eviction.

BRIEF DESCRIPTION OF THE DRAWINGS

FIG. 7 is a flow diagram illustrating an example method, according to some embodiments.

DETAILED DESCRIPTION

In disclosed embodiments, registers are memory-backed and therefore may be stored in various levels of a cache/memory hierarchy. As one example, GPU general purpose register data may be stored in reservation stations, physical registers, operand caches near datapath circuitry, one or more data caches that also store other types of data, system memory, etc. Therefore, register data may be evicted from a given cache level while operations that still need the data are being executed. Generally, such evictions should be avoided, when possible, to preserve register data closer to the execution pipelines. Tracking which registers are being used (and thus should be preserved at a given cache level) may be complex, however, in terms of circuit area and power consumption.

In disclosed embodiments, one or more lock frames are defined that include a lock indicator (e.g., a bit) per architectural register per thread (or per single-instruction multiple-data (SIMD) group where a SIMD group may include multiple threads). Note that threads/SIMD groups may be assigned to channels for execution, so the control circuitry may maintain frames on a per channel basis (thus maintaining at least one lock indicator per architectural register per channel).

In some embodiments, each time a register is accessed (e.g., at a map pipeline stage), its lock indicator is set. Control circuitry preserves register data in a data cache by preventing eviction of cache lines that store any register data with a lock bit set. The control circuitry may bulk unlock the lock indicators, e.g., when the number of locks in a frame meets a threshold or when a channel is stalled for a threshold number of cycles. Further, multiple lock frames may be defined for a given channel so that processing can move to a new lock frame while the old frame drains. In some embodiments, a given frame may thus be accumulating, draining, or invalid.

Note that a given lock indicator may remain set after its corresponding register data is no longer being used, in these embodiments. Therefore, at least theoretically, some cache lines may remain in the cache that could have been evicted. Overall, however, these embodiments may advantageously provide similar performance to implementations with more precise tracking (e.g., that implement a use counter per register) with substantial reductions in power consumption and area relative to those implementations.

Graphics Processing Overview

Figure 1A:
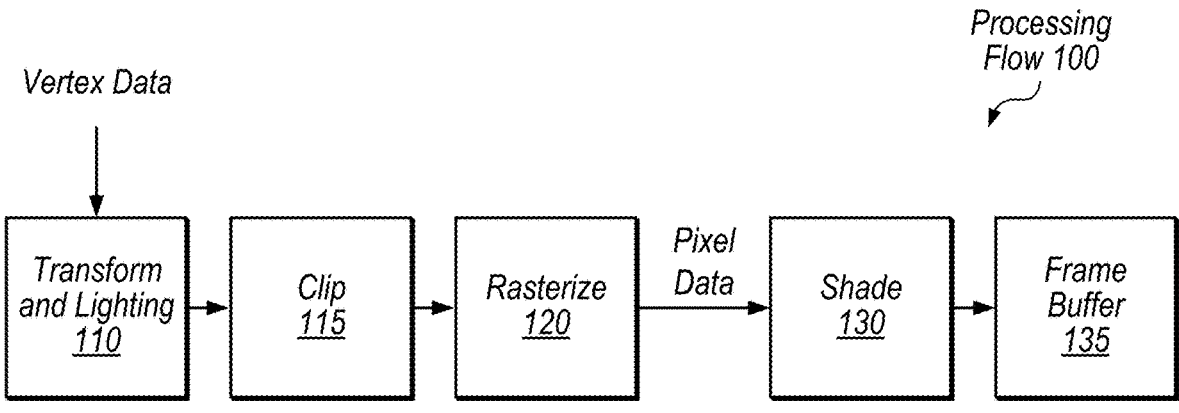
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
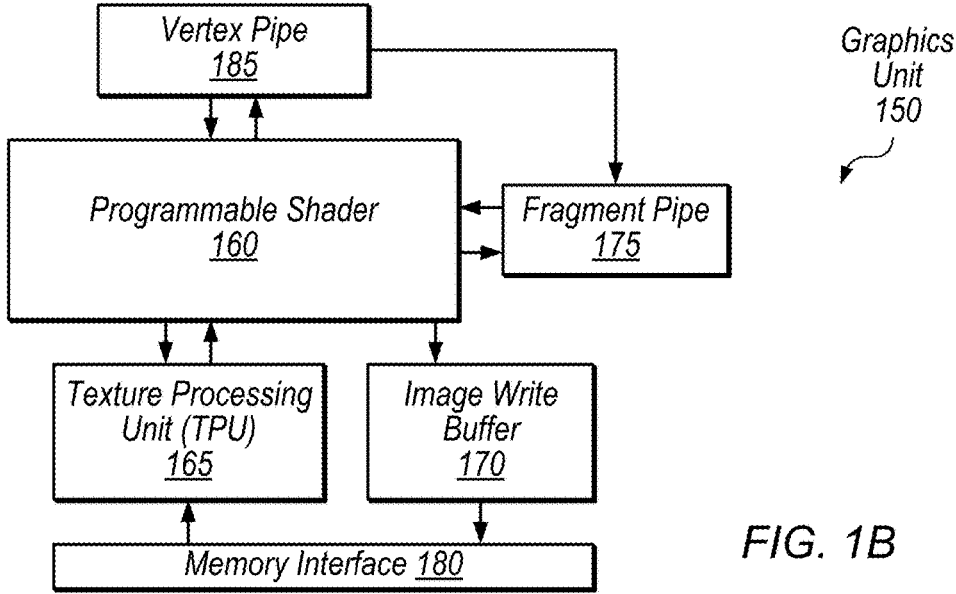
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread groups), single instruction parallel thread (SIPT), or lane-stacked threads.

Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Overview of Register Preservation

Figure 2:
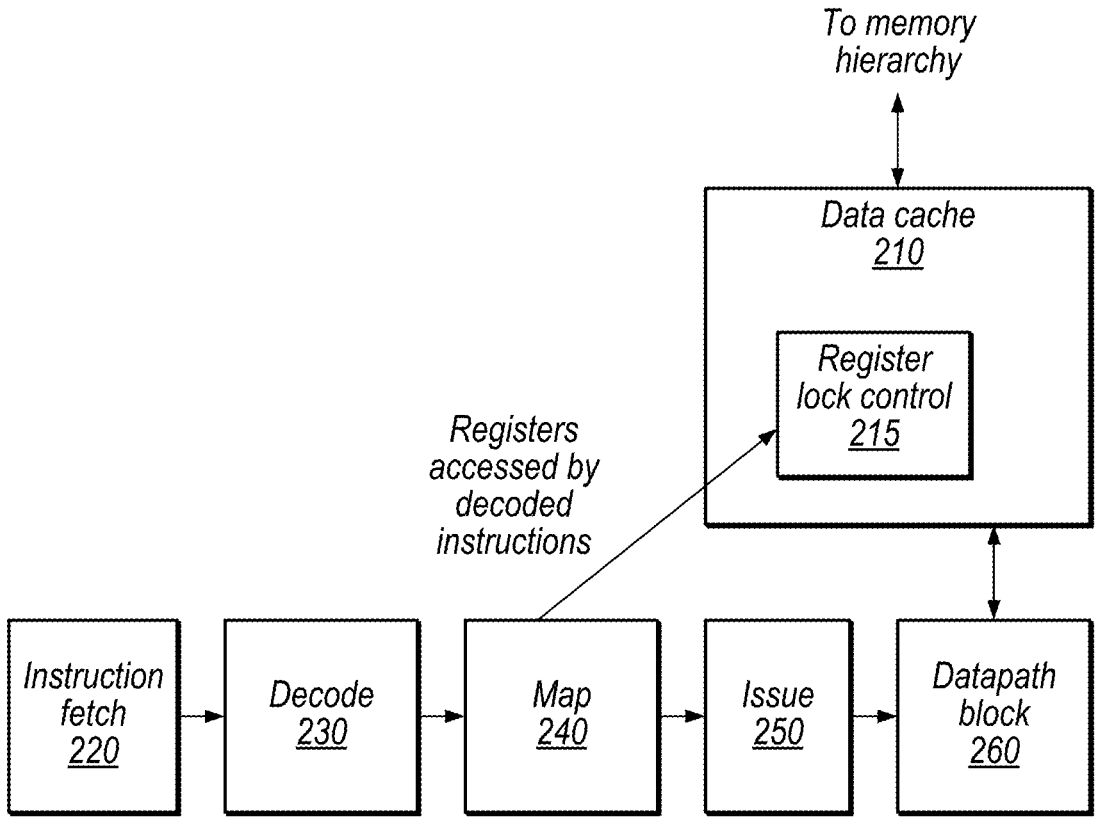
FIG. 2 is a block diagram illustrating an example pipeline with register lock control for a data cache, according to some embodiments.

FIG. 2 is a block diagram illustrating an example pipeline with register lock control for a data cache, according to some embodiments. In the illustrated embodiment, the processor includes data cache 210 (which in turn includes register lock control 215), instruction fetch circuitry 220, decode circuitry 230, map circuitry 240, issue circuitry 250, and datapath block circuitry 260. Note that the illustrated pipeline stages are included for purposes of illustration but are not intended to limit the scope of the present disclosure. In various embodiments, stages may be rearranged, other stages may be included between illustrated stages, stages may be omitted or replaced, etc.

Instruction fetch circuitry 220, in some embodiments, is configured to fetch instructions from execution. Instruction fetch circuitry may interact with various branch predictors, prefetchers, etc. to determine which instructions to fetch. Instructions may be stored in one or more instruction caches, some of which may be dedicated for instruction storage and some of which may be shared. Instruction caches may be included in the same unified memory architecture as data caches, in some embodiments.

Decode circuitry 230, in some embodiments, is configured to at least partially decode instructions, e.g., based on their opcode. Decode circuitry may determine types and identifiers of input and output operands for instructions and may also determine a target execution unit of a given instruction based on the nature of the instruction. Decode unit may generate multiple sub-instructions or microoperations for some instructions.

Map circuitry 240, in some embodiments, is configured to map architectural registers to locations (e.g., cache lines) in a data cache. In other embodiments, map circuitry 240 is configured to map architectural registers to physical registers. In these embodiments, map circuitry 240 may be utilized in the context of register renaming and may assign operands to reservation stations. In other embodiments, register renaming may not be implemented.

In the illustrated embodiment, in response to a successful mapping, map circuitry 240 indicates registers accessed by decoded instructions to register lock control 215. Therefore, register lock control 215 may eventually receive indications of all registers accessed by datapath block 260 for a given channel.

Note that non-limiting examples of pipeline channels in the SIMD context are discussed in U.S. patent application Ser. No. 18/054,376, titled "Multi-stage Thread Scheduling" and filed Nov. 10, 2022. The channel-based circuitry described in the '376 application is one example that may be utilized in various embodiments disclosed herein. In other embodiments, similar techniques may be utilized without channels, e.g., with frames on a per-SIMD group or per-thread basis without a SIMD group or thread being mapped to a channel.

Issue circuitry 250, in some embodiments, is configured to issue instructions to datapath block 260 for execution. Issue circuitry 250 may wait to resolve dependencies or for other issue conditions. Issue circuitry 250 may also arbitrate among channels for access to certain execution pipelines.

Datapath block circuitry 260, in some embodiments, is configured to perform instructions. Datapath block 260 may include multiple types of execution units (e.g., integer unit(s), floating-point unit(s), load-store unit(s), etc.) and may perform instructions over multiple cycles. Datapath block circuitry 260 may access operand data from data cache 210 and write operand results to data cache 210. Datapath block circuitry 260 may also include one or more internal operand caches and may implement result forwarding, such that some executions may execute without accessing data cache 210.

Data cache circuitry 210, in some embodiments, is a low-level data cache and may be referred to as a DL0 data cache. In other embodiments, data cache 210 is a higher-level cache. Data cache 210 may be set associative, fully associative, or direct mapped. Data cache 210 may include valid, tag, data, and replacement (e.g., LRU) fields, for example. Data cache 210 may include control circuitry configured to map register identifiers to the cache lines on which those registers' data is to be stored. This control circuitry may use the mapping to determine a cache line based on a provided register identifier.

Register lock control circuitry 215, in some embodiments, is configured to prevent eviction of cache lines in data cache 210 that store register data with a lock indicator set. For example, for a given eviction operation, register lock control circuitry 215 may select from only a set of cache lines that do not have any corresponding lock indicators set. This may override or modify a default replacement policy. For example, under a least-recently-used (LRU) policy, a non-LRU cache line may be selected for eviction if one or more less-recently-used lines have corresponding lock indicators set. This may advantageously preserve register data for datapath block 260, as discussed above.

In some embodiments, functionality of register lock control circuitry 215 is split between channel manager circuitry (discussed in further detail below) and data cache control circuitry. For example, in some embodiments, the process of register locking begins in the channel manager. Subsequent to a channel completing instruction decode, the channel manager is configured to issue a map check request to data cache 210. Data cache 210 may determine whether a register being referenced by the instruction resides in the cache (e.g., using scoreboard circuitry). If the register is not resident, data cache 210 may check with the memory hierarchy and attempt to fetch the data (which may have been previously evicted). Depending on the response, the channel manager may deactivate the current SIMD group from the channel and attempt to execute useful work from another SIMD group. If the register is resident in data cache 210, register lock control 215 may lock the corresponding cache line and inform the channel manager of the successful map check. The channel manager may then proceed with one or more remaining commit checks before committing the instruction for execution.

In some embodiments, the lock is absolute, such that register lock control 215 is configured to always prevent eviction of cache lines with a corresponding lock indicator set. In other embodiments, the lock may be overridden in certain circumstances. In various embodiments, the thresholds for unlocking lock indicators, switching lock frames, or both may vary under different operating conditions.

In some embodiments, control circuitry manages frames such that a given frame is either valid or invalid. A valid frame may be in an accumulating state or a draining state. In some embodiments, for a given channel, up to one frame is allowed to be accumulating and up to one frame is allowed to be draining. In some embodiments, each instruction that issues a map check request to the data cache 210 sets corresponding indicator(s) of the frame in the accumulating state.

Note that while various GPU-specific examples are discussed herein, similar techniques may be used in other types of processors, e.g., CPUs, AI-accelerators, embedded processors, etc. Similarly, disclosed techniques may be utilized at one or more of various cache levels in a given computing system. Still further, the granularity of register use tracking may vary in different embodiments. For example, frame switch thresholds may vary, lock indicators may be utilized at different granularities (such as a lock indicator that corresponds to multiple registers), etc.

Example Lock Indicator Frame Configurations and Techniques

Figure 3:
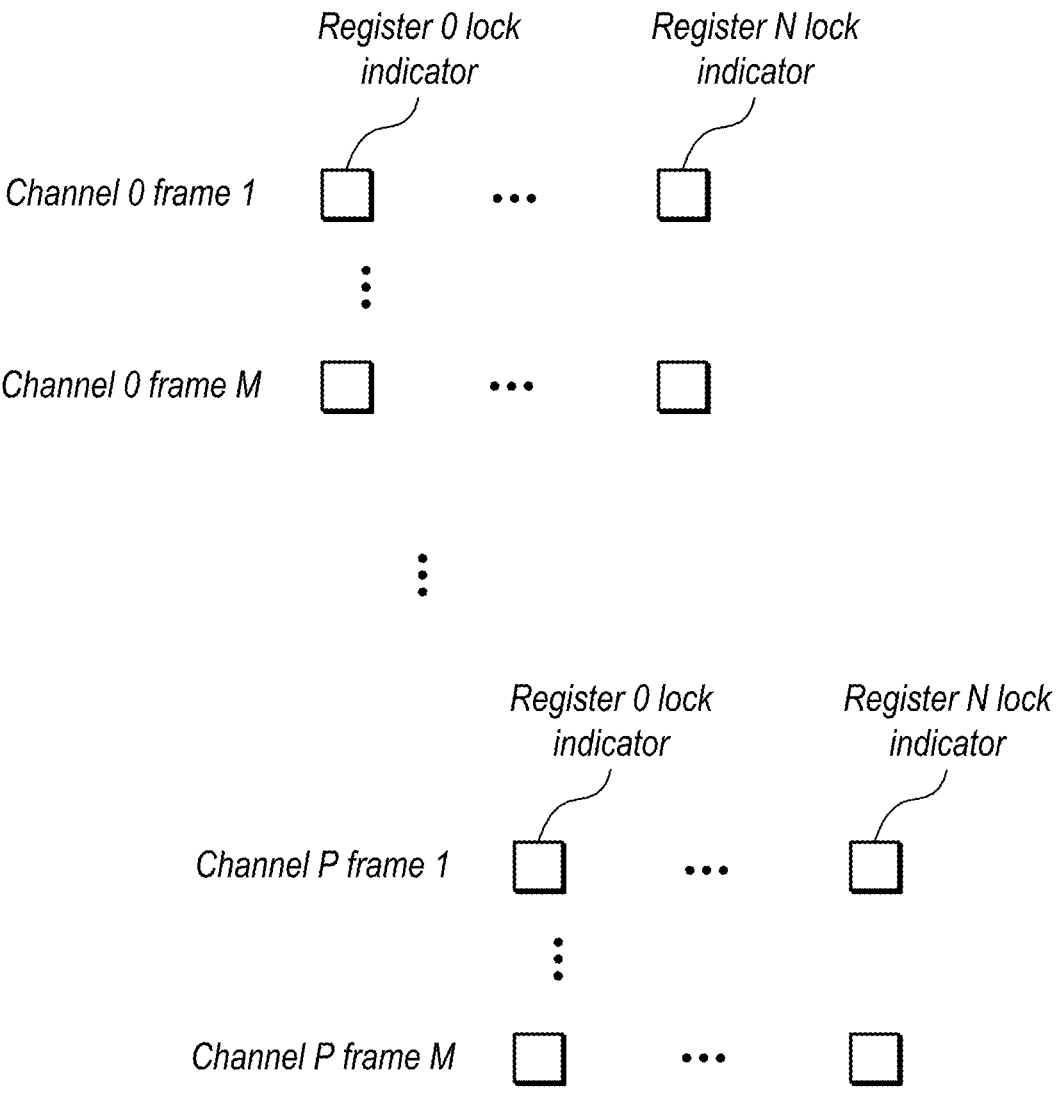
FIG. 3 is a diagram illustrating example lock indicators, according to some embodiments.

FIG. 3 is a diagram illustrating example lock indicators, according to some embodiments. In the illustrated embodiment, a given frame maintained by lock control circuitry includes a lock indicator for each of N+1 registers for each of P+1 channels. Further, in this example, the lock control circuitry includes M+1 frames per channel. In some embodiments, two frames are implemented per channel, although additional frames may be implemented to increase buffering in other embodiments. In some embodiments, each lock indicator is a single bit.

The illustrated indicators may be maintained by map circuitry 240 or by register lock control 215, for example. In some embodiments, the lock indicators are maintained by a channel manager (e.g., channel manager circuitry 635 of FIG. 6, discussed in detail below).

Figure 4:
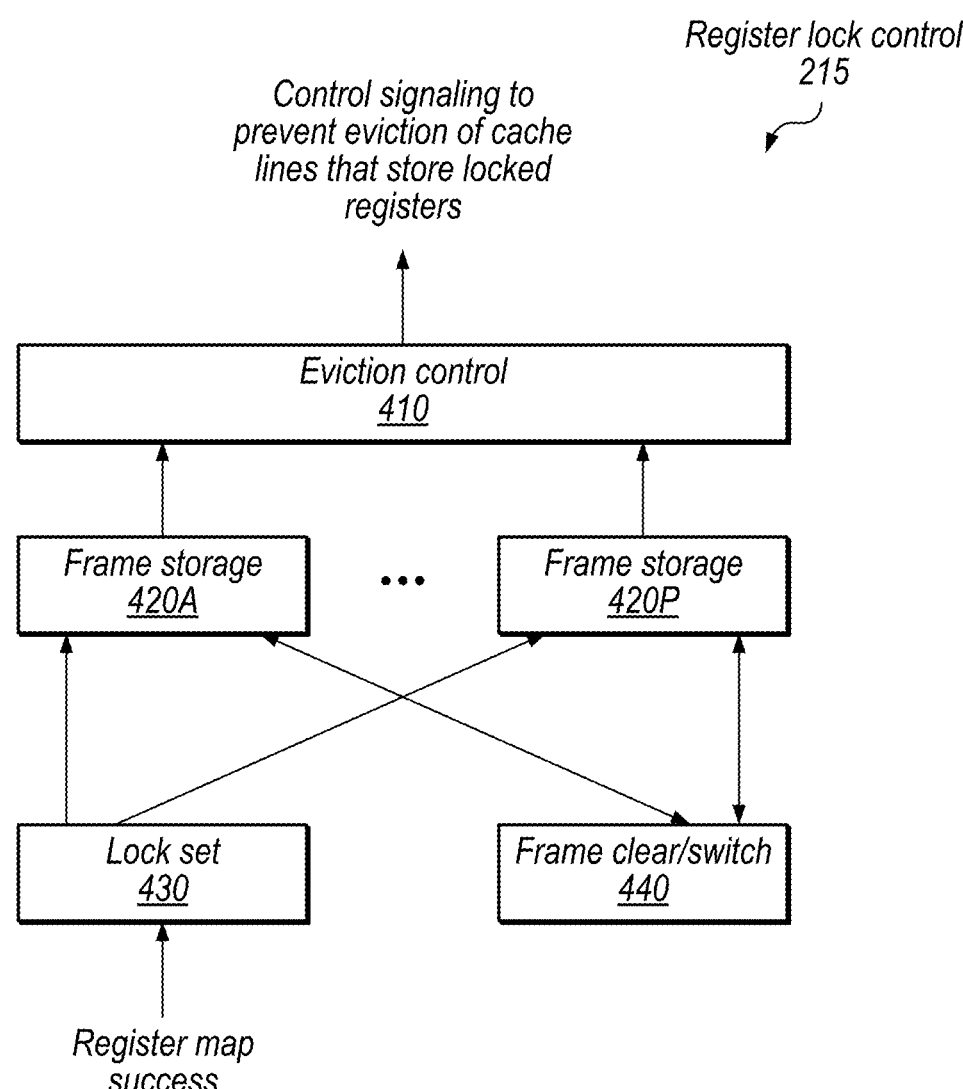
FIG. 4 is a block diagram illustrating example register lock control circuitry, according to some embodiments.

FIG. 4 is a diagram illustrating a detailed example of register lock control circuitry 215, according to some embodiments. In the illustrated example, register lock control 215 includes eviction control circuitry 410, frame storage circuitry 420A-420P, lock set circuitry 430, and frame clear/switch circuitry 440.

Eviction control circuitry 410, in some embodiments, is configured to generate control signaling to prevent eviction of cache lines that store locked registers, based on one or more frames in frame storage 420A-420P. Frame storage 420, in some embodiments, corresponds to a set of valid frames for a set of channels (and may include storage for both an accumulating frame and a draining frame for a given channel).

Lock set circuitry 430, in some embodiments, is configured to set lock indicators based on register map success information from map circuitry 240.

Frame clear/switch circuitry 440, in some embodiments, is configured to clear frames (e.g., changing a current frame to a draining state and switching to a new frame in an accumulating state) in response to certain frame switch conditions. Examples of conditions include a threshold number of indicators in a given frame being set, a stall condition (e.g., in issue stage circuitry 250), or a compiler hint indicating that a frame switch should occur. The compiler hint may utilize a new instruction or a field or bit within an existing instruction, for example. The compiler hint may be detected by decode circuitry 230, for example.

In some embodiments, a compiler is operable to include hint information in a set of compiled instructions to indicate that a frame flush/switch should occur. This may be based on a determination or estimate that the program being finished with most of the operand data it is currently using, for example.

In some embodiments, instructions are tagged with a frame identifier (e.g., a single bit for a two-frame implementation or multiple bits for implementations with three or more frames). This frame identifier may facilitate a fence operation by register lock control 215 to ensure that all operations that use the outgoing frame reach a certain pipeline stage before any operations that use the incoming frame proceed past that stage. This may prevent cache lines from being incorrectly flushed during the switch.

Figure 5:
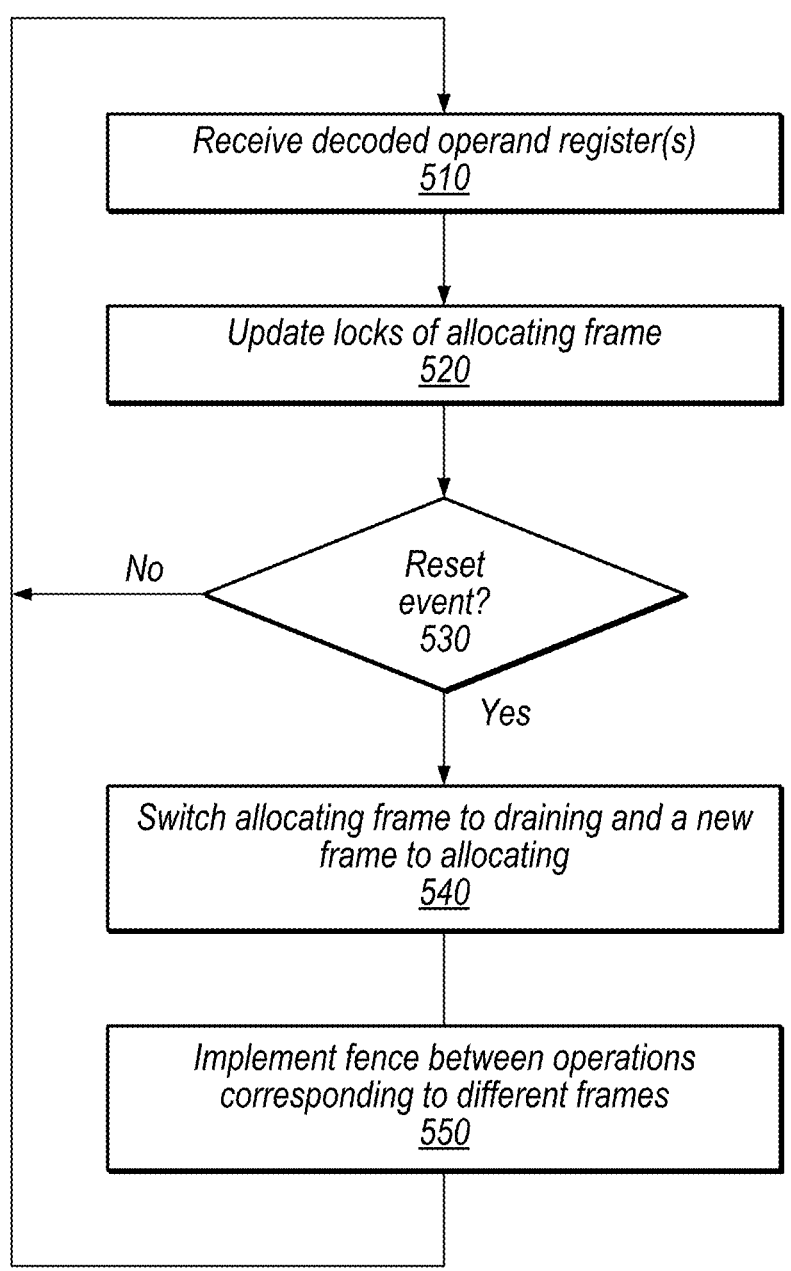
FIG. 5 is a flow diagram illustrating an example technique to switch to a new frame of lock indicators, according to some embodiments.

FIG. 5 is a flow diagram illustrating an example technique for populating and switching lock frames, according to some embodiments. At 510, in the illustrated embodiment, control circuitry receives decoded operand register(s). At 510, in the illustrated embodiment, the control circuitry updates locks of the allocating frame.

At 530, control circuitry determines whether there is a reset event (e.g., a frame switch event). As discussed above, frame switches may occur in response to various events, such as a threshold number of lock indicators being set in a frame, a compiler hint, a channel stall, etc.

In some embodiments, control circuitry may implement a heuristic to determine when to initiate frame switching. As one example, for a given channel, a frame switch may be triggered if (A) an active channel has made not forward progress in a stage for N cycles or (B) the number of set lock indicators in the current frame has reached a threshold M. Both N and M may be programmable.

If there is not a reset event at 530, flow returns to 510. If there is a reset event, flow proceeds to 540.

At 540, in the illustrated embodiment, control circuitry switches the allocating frame to a draining state and a new frame to the allocating state. At 550, in the illustrated embodiment, control circuitry implements a fence between operations corresponding to different frames. In some embodiments, elements 540 and 550 include the following operations.

The channel manager may mark the last microoperation that contributed to the current frame as the last_op_in_frame and update the frame color of the current frame for map check requests to point to a new frame (the new frame that is now in the accumulating check) such that the map check requests start setting indicators in the new frame. The channel manager may wait for the last_op_in_frame to pass through a certain pipeline stage to ensure that all instructions associated with the draining frame have read all of their source register.

If the draining frame is not the last frame of a deactivating SIMD group, the channel manager may notify the data cache to unlock the registers associated with the draining frame (excluding registers locked by the new accumulating frame or dirty registers still present in other caches or marked as last-use in an operand cache). Concurrent with unlocking the registers in the data cache for the draining frame, the channel manager may update the lock vector of the new accumulating frame to include dirty registers still present in other caches or marked as last-use in an operand cache.

Figure 6:
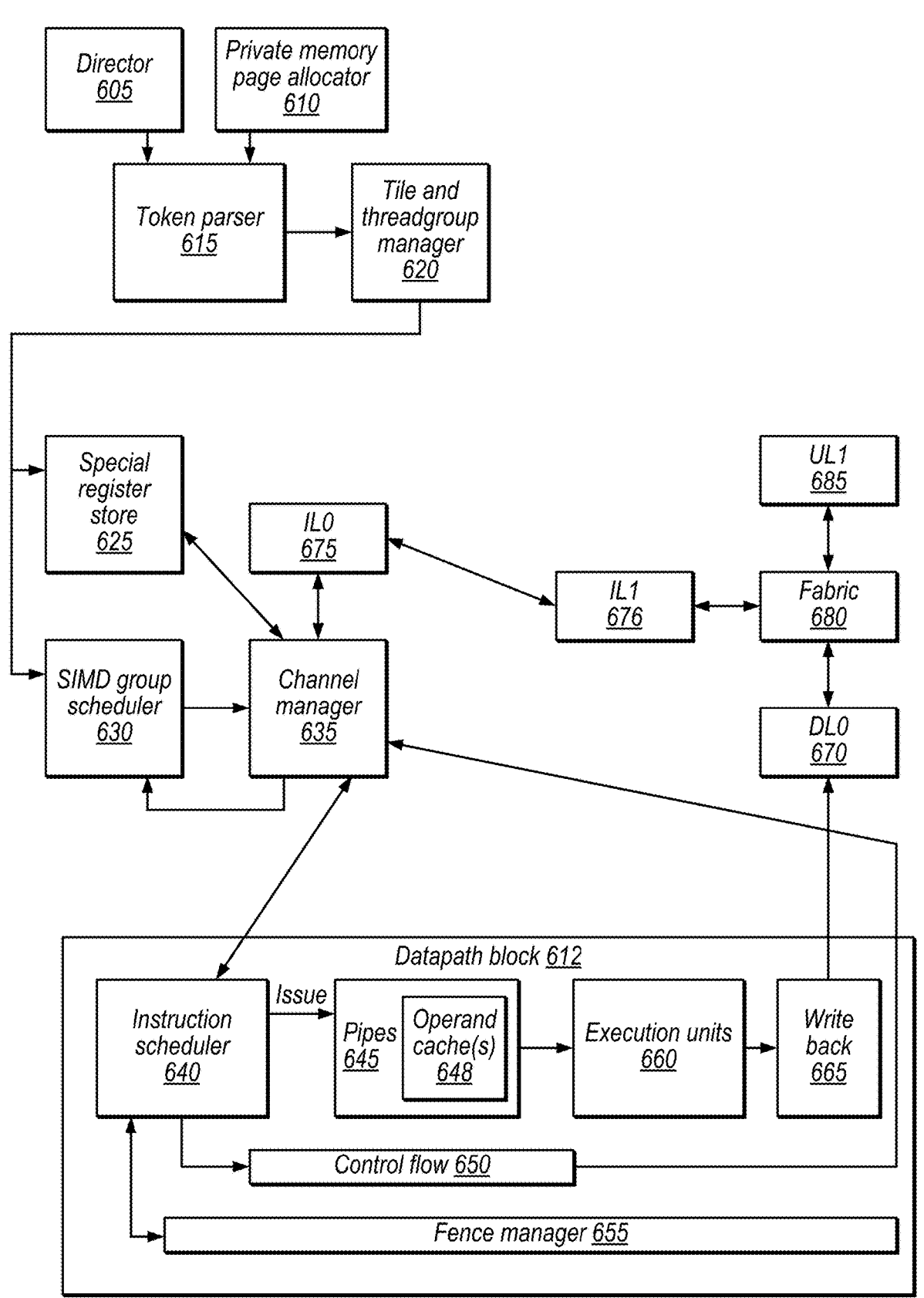
FIG. 6 is a block diagram illustrating an example detailed shader processor that includes operand caches, data caches, and rename circuitry, according to some embodiments.

Generally, a processor may include one or more operand caches between the data cache and the datapath circuitry, as shown in FIG. 6 which is discussed in detail below. In some embodiments, control circuitry may flush operand data from one or more operand cache entries that are indicated as last-use in response to a reset event. Entries may be marked as last-use as a hint that those entries will not be used again in the near future and that they therefore should not remain in an operand cache after that use. Entry that are not marked as last-use may be flash-cleared in response to a reset event.

Example Shader Processor

FIG. 6 is a block diagram illustrating an example shader that may include the pipeline of FIG. 2, according to some embodiments. In the illustrated embodiment, shader 160 includes director 605, private memory page allocator 610, token parser 615, tile and threadgroup manager 620, special register store 625, SIMD group scheduler 630, channel manager 635, datapath block 612, data level 0 (DL0) cache 670, instruction level 0 cache (IL0) 675, instruction level 1 (IL1) cache 676, fabric 680, and unified level 1 (UL1) cache 685.

Director circuitry 605 may provide work from multiple data masters (e.g., a compute data master, vertex data master, and pixel data master) to token parser 615. Private memory page allocator 610 may allocate pages for private memory spaces, as requested by token parser 615. Note that elements 605 and 610 may be external to shader 160 and may communicate with multiple shaders 160.

Token parser 615, in some embodiments, is configured to receive work tokens from multiple data masters, form SIMD groups, and interact with allocator 610 to allocate pages for private memory.

Tile and threadgroup manager 620, in some embodiments, is configured to coordinate execution of SIMD groups within a tile (e.g., for pixel work) or threadgroup (e.g., for compute work). This may include enforcing various types of synchronization, for example.

SIMD group scheduler 630, in some embodiments, is configured to manage SIMD-group-scoped state information and identify highest-priority cliques that are ready to execute, according to an arbitration scheme. The arbitration scheme may be primarily age-based but may also consider other factors. SIMD group scheduler may correspond to stage 1 schedule in a two-stage scheduler.

Channel manager circuitry 635, in some embodiments, is configured to fetch instructions and dispatch them to instruction scheduler 640. It may manage channel activation and deactivation, manage the program counter for a given SIMD group, manage architectural state (e.g., accessing special register store 625, which may implement SIMD-group-scoped architectural special registers such as the program counter), fetch instructions, and dispatch instructions. Channel manager 635 may read the special register store 625 when activating a SIMD group into a channel and write special register store 625 when deactivating a SIMD group from a channel. As discussed above, certain locking functionality disclosed herein may be implemented by channel manager 635.

Datapath block 612, in some embodiments, is configured to execute dispatched instructions and may include channel pipelines and shared execution pipelines. Datapath block 612 may be instantiated multiple times in a given GPU. In the illustrated embodiment, datapath block 612 includes instruction scheduler 640, pipeline circuitry 645, operand caches 648, execution units 660, write back stage circuitry 665, control flow circuitry 650, and fence manager 655.

Instruction scheduler 640, in some embodiments, is configured to manage execution resources inside datapath block 612 and schedule individual instruction execution. This may include fine decode of incoming instructions, sequencing microoperations, data dependency and hazard detection, managing a read operand cache and write buffer circuitry, priority-based instruction scheduling, generating read and write requests to DL0 675, generating pipeline control signals, and enforcing SIMD group deactivations.

Pipelines 645 may include one or more math pipelines (which may execute floating-point, integer, and iterate instructions, for example), one or more address generator pipelines (e.g., for load, store, atomic, sample, and image write instructions), and one or more control flow units (shown separately as control flow circuitry 650) configured to execute conditional and branch instructions. Execution units 660 may perform various types of operations for the pipelines 645. As shown, operand cache(s) 648 may be the lowest level of operand storage. Write-back stage 665 may write results to DL0. Note that write operations may be posted.

Fence manager circuitry 655, in some embodiments, is configured to ensure that data dependencies outside of datapath block 612 are maintained. As discussed in detail below, fence manager 655 may implement fence counters per SIMD group per fence (e.g., where a non-zero fence count indicates an outstanding dependency). Fence manager 655 may also implement an ordered instruction queue per channel (referred to as a channel queue) to tracked pipelined fences for committed instructions. In some embodiments, fence manager 655 may trigger deactivation of a channel in certain situations.

DL0 cache 670, in some embodiments, is configured to cache all or a portion of registers included in thread private memory. In some embodiments, a given DL0 cache 670 is associated with one datapath block 612. Instruction scheduler 640 may initiate tag lookups in DL0 cache 670. DL0 cache 670 is one example of data cache 210 of FIG. 2.

IL0 cache 675, in some embodiments, is the lowest-level instruction cache and is configured to provide instructions to one or more stages of channel manager 635. IL1 cache 676, in some embodiments, is configured to respond to fill requests from IL0 cache 675 and may retrieve instruction data from UL1 cache 685 via fabric 680 for misses. Example embodiments of IL0 cache 675 and IL1 cache 676 are discussed in detail below with reference to FIG. 12.

Fabric circuitry 680, in some embodiments, is a packet-switched network that provides communication between a number of shader modules. As some examples of communications via fabric circuitry 680, caches may access thread-private memory, the token parser 615 may initialize SIMD group and threadgroup state stored in UL1 prior to launching a SIMD group, sampling and image write pipes may read interface-private memory, texture processing results may be forwarded to stack registers, vertex circuitry may send fetch requests for vertex data, IL1 cache 676 may request IL1 miss data from global memory, global memory may receive evictions and line fill requests, etc.

UL1 cache 685, in some embodiments, is a unified instruction and data cache configured to store data evicted from IL1 cache 676 and DL0 cache 670. In other embodiments, IL1 cache 676 is a read-only cache that may retrieve data from UL1 cache 685 but does not evict data to IL1.

Example Method

FIG. 7 is a flow diagram illustrating an example method, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a computing system decodes instructions for execution, where the instruction indicate operations on register operand data.

At 720, in the illustrated embodiment, the computing system provides memory backing for register operand data in one or more caches. Note that a memory backing approach may mean that register data cached at a given level may be evicted and may need to be re-retrieved in certain scenarios. Disclosed lock techniques may prevent or mitigation such evictions.

At 730, in the illustrated embodiment, the computing system controls a first set of lock indicators for a set of registers for a first thread, including to assert one or more lock indicators for registers that are indicated, by the decode circuitry, as being utilized by decoded instructions of the first thread. The lock indicators may be updated based on completed map check requests, for example. Note that "asserting" and "clearing" a given indicator may refer to setting the indicator to various different values, but no polarity or particular values are implied. For example, for a single-bit lock indicator, asserting the value may refer to setting the value to a "0" or a "1" in different embodiments while clearing the indicator may refer to setting the bit to the opposite value.

At 740, in the illustrated embodiment, the computing system preserves register operand data in the one or more caches, including preventing eviction of a given cache line from a cache based on an asserted lock indicator, where the asserted lock indicator is for a register for which operand data is stored in the given cache line.

At 750, in the illustrated embodiment, the computing system clears the first set of lock indicators in response to a reset event. In some embodiments, the reset event corresponds to a threshold number of registers in the set of registers being locked, a threshold number of stall cycles of the first thread in a pipeline stage, a compiler hint, or some combination thereof.

Note that indicators in the set of indicators, in some embodiments, are not cleared until the reset event. This may mean that a given register may remain locked even after all instructions that access the register have completed. This conservative approach may provide sufficient performance, however, with lower area and power consumption relative to more granular register use tracking.

In some embodiments, the computing system is configured to control a second set of lock indicators for the set of registers for the first thread and switch from the first set of lock indicators to the second set of lock indicators in response to the reset event. In some embodiments, the computing system is configured to pipeline, at least through a schedule pipeline stage, information that identifies a set of lock indicators corresponding to a given operation. In some embodiments, the computing device is configured to perform a fence operation in response to the reset event such that all operations that use the first set of lock indicators reach a pipeline stage before any operations that use the second set of lock indicators proceed past the pipeline stage.

In some embodiments, the computing system includes an operand cache configured to store register operand data and maintain last-use indicators for one or more operand cache entries. In some embodiments, the computing system is configured to, in response to the reset event, flush operand data to the memory hierarchy circuitry from one or more operand cache entries indicated as being last-use.

In some embodiments, scoreboard circuitry is configured to track which architectural registers are stored at a first cache level and the computing device is configured to assert a lock indicator for a register in response to a map request confirming, based on the scoreboard circuitry, that operand data for the corresponding register is stored at the first cache level. In some embodiments, physical registers may be tracked in addition to or in place of architectural registers.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 8:
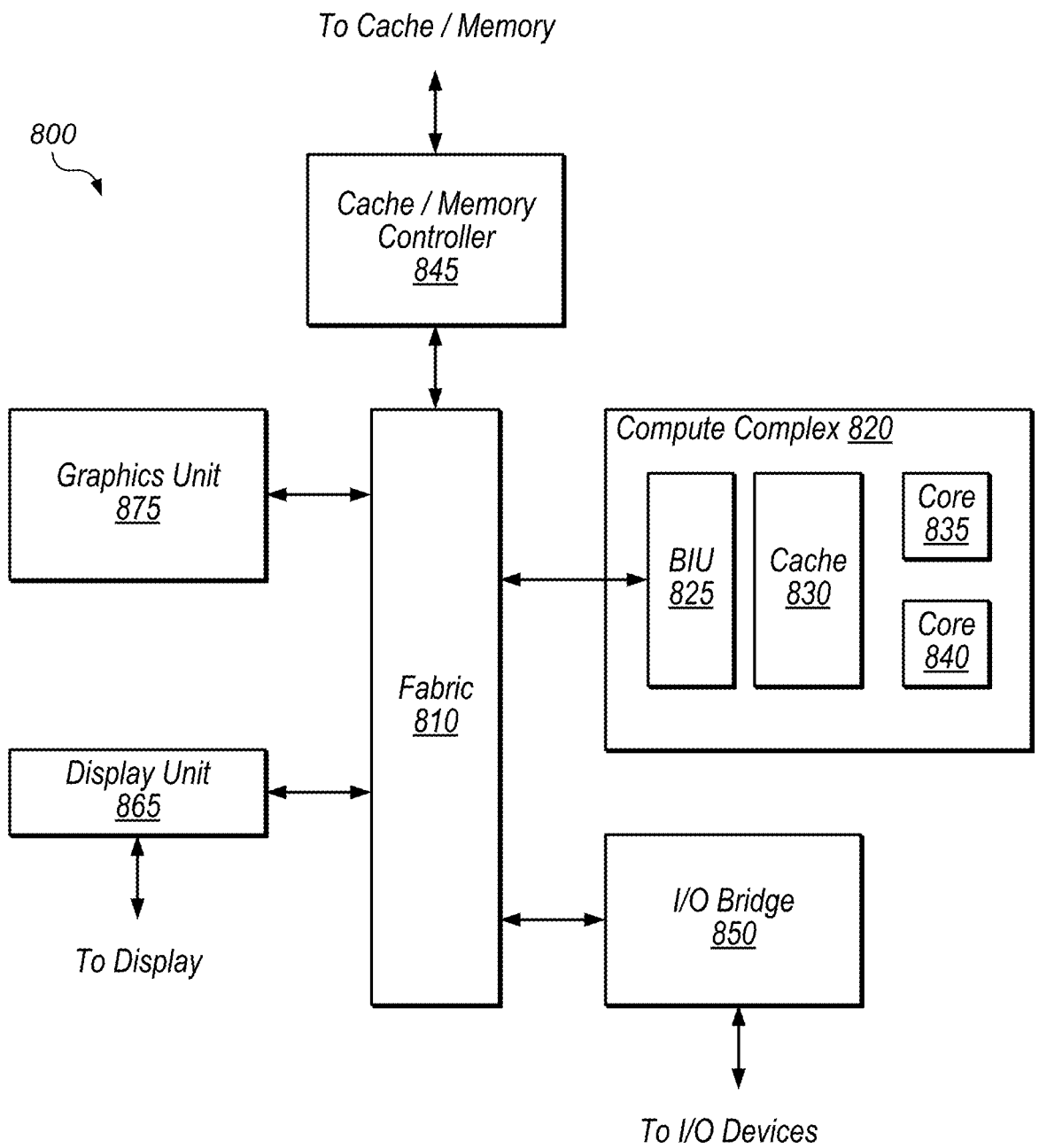
FIG. 8 is a block diagram illustrating an example computing device, according to some embodiments.

Referring now to FIG. 8, a block diagram illustrating an example embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820 input/output (I/O) bridge 850, cache/memory controller 845, graphics unit 875, and display unit 865. In some embodiments, device 800 may include other components (not shown) in addition to or in place of the illustrated components, such as video processor encoders and decoders, image processing or recognition elements, computer vision elements, etc.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and caches. For example, compute complex 820 may include 1, 2, or 4 processor cores, or any other suitable number. In one embodiment, cache 830 is a set associative L2 cache. In some embodiments, cores 835 and 840 may include internal instruction and data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 875 may be described as "coupled to" a memory through fabric 810 and cache/memory controller 845. In contrast, in the illustrated embodiment of FIG. 8, graphics unit 875 is "directly coupled" to fabric 810 because there are no intervening elements.

Graphics unit 875 may include one or more processors, e.g., one or more graphics processing units (GPU's). Graphics unit 875 may receive graphics-oriented instructions, such as OPENGL®, Metal, or DIRECT3D® instructions, for example. Graphics unit 875 may execute specialized GPU instructions or perform other operations based on the received graphics-oriented instructions. Graphics unit 875 may generally be configured to process large blocks of data in parallel and may build images in a frame buffer for output to a display, which may be included in the device or may be a separate device. Graphics unit 875 may include transform, lighting, triangle, and rendering engines in one or more graphics processing pipelines. Graphics unit 875 may output pixel information for display images. Graphics unit 875, in various embodiments, may include programmable shader circuitry which may include highly parallel execution cores configured to execute graphics programs, which may include pixel tasks, vertex tasks, and compute tasks (which may or may not be graphics-related).

Disclosed techniques may preserve register data at one or more cache levels, which may improve performance of graphics unit 875 with reasonable costs in terms of area and power consumption.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and low-power always-on functionality, for example. I/O bridge 850 may also include interfaces such as pulse-width modulation (PWM), general-purpose input/output (GPIO), serial peripheral interface (SPI), and inter-integrated circuit (I2C), for example. Various types of peripherals and devices may be coupled to device 800 via I/O bridge 850.

In some embodiments, device 800 includes network interface circuitry (not explicitly shown), which may be connected to fabric 810 or I/O bridge 850. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 800 with connectivity to various types of other devices and networks.

Example Applications

Figure 9:
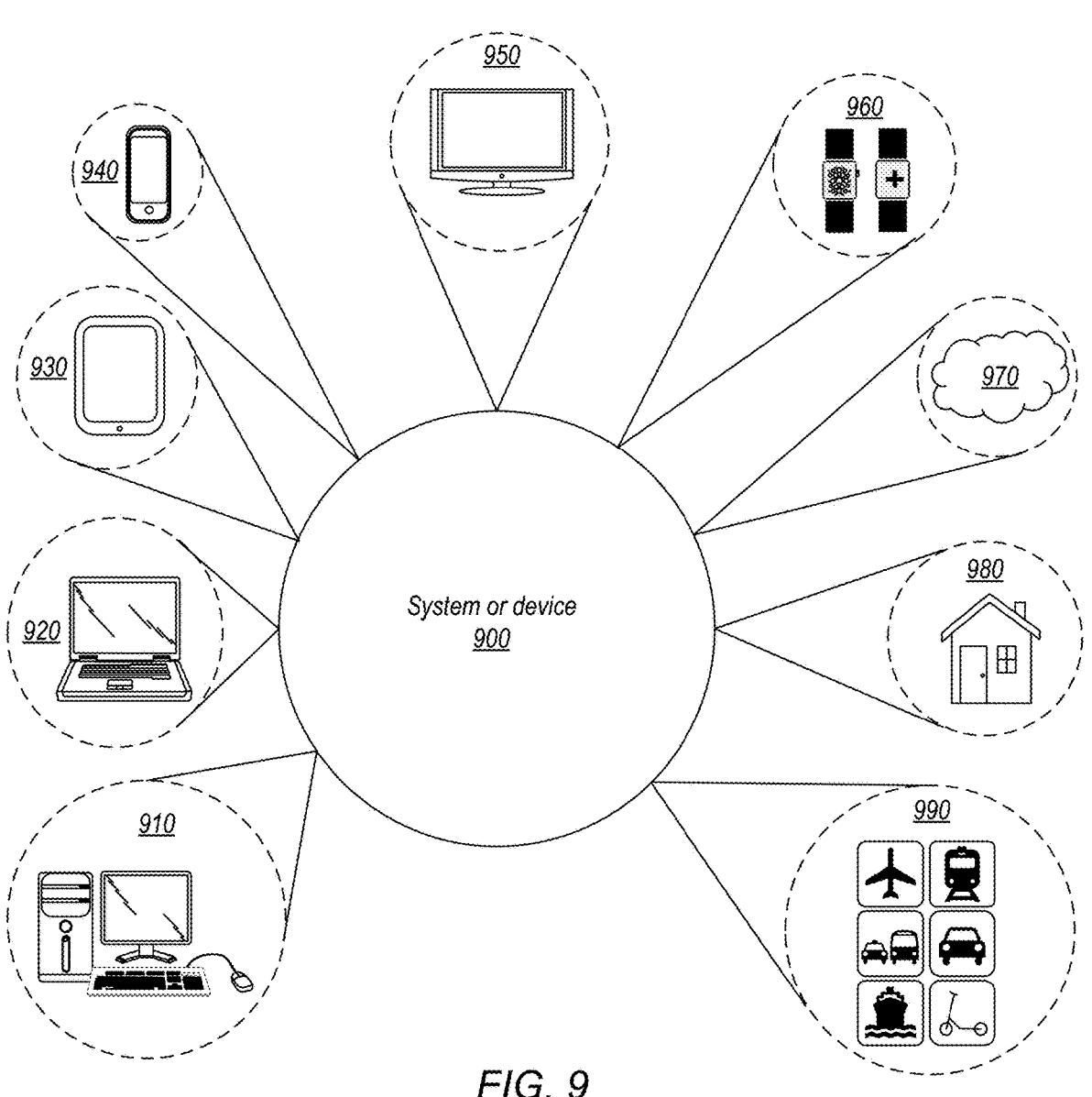
FIG. 9 is a diagram illustrating example applications of disclosed systems and devices, according to some embodiments.

Turning now to FIG. 9, various types of systems that may include any of the circuits, devices, or system discussed above. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized every-day devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exem-plary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 10:
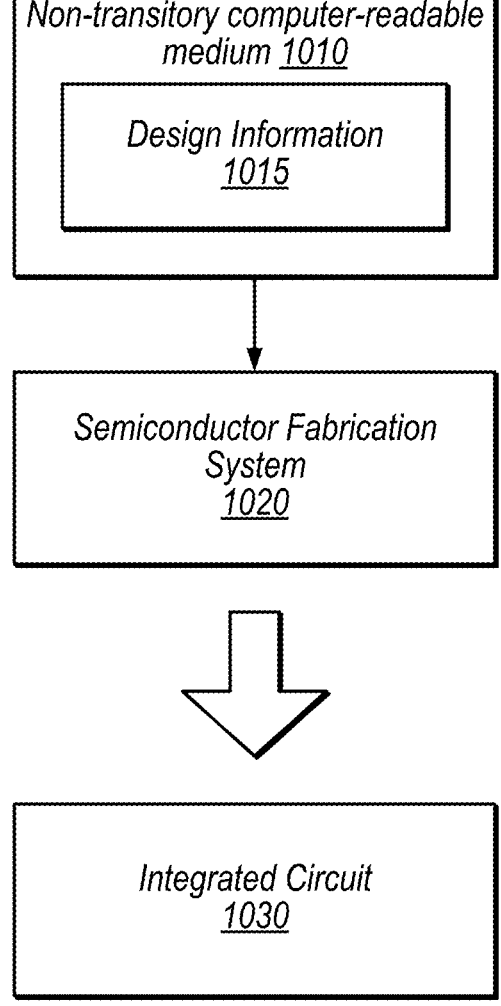
FIG. 10 is a block diagram illustrating an example computer-readable medium that stores circuit design information, according to some embodiments.

FIG. 10 is a block diagram illustrating an example non-transitory computer-readable storage medium that stores circuit design information, according to some embodiments. In the illustrated embodiment semiconductor fabrication system 1020 is configured to process the design information 1015 stored on non-transitory computer-readable medium 1010 and fabricate integrated circuit 1030 based on the design information 1015.

Non-transitory computer-readable storage medium 1010, may comprise any of various appropriate types of memory devices or storage devices. Non-transitory computer-read-able storage medium 1010 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1010 may include other types of non-transitory memory as well or combinations thereof. Non-transitory computer-readable storage medium 1010 may include two or more memory mediums which may reside in different locations, e.g., in different computer systems that are connected over a network.

Design information 1015 may be specified using any of various appropriate computer languages, including hard-ware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semi-conductor fabrication system 1020. In some embodiments, design information 1015 may also include one or more cell libraries which specify the synthesis, layout, or both of integrated circuit 1030. In some embodiments, the design information is specified in whole or in part in the form of a netlist that specifies cell library elements and their connec-tivity. Design information 1015, taken alone, may or may not include sufficient information for fabrication of a cor-responding integrated circuit. For example, design informa-tion 1015 may specify the circuit elements to be fabricated but not their physical layout. In this case, design information 1015 may need to be combined with layout information to actually fabricate the specified circuitry.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication sys-tem 1020 may also be configured to perform various testing of fabricated circuits for correct operation.

In various embodiments, integrated circuit 1030 is con-figured to operate according to a circuit design specified by design information 1015, which may include performing any of the functionality described herein. For example, integrated circuit 1030 may include any of various elements shown in FIGS. 1B, 2, 4, 6, and 8. Further, integrated circuit 1030 may be configured to perform various functions described herein in conjunction with other components. Further, the functionality described herein may be per-formed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The various techniques described herein may be per-formed by one or more computer programs. The term "program" is to be construed broadly to cover a sequence of instructions in a programming language that a computing device can execute. These programs may be written in any suitable computer language, including lower-level lan-guages such as assembly and higher-level languages such as Python. The program may written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   processor pipeline circuitry configured to perform operations on register operand data;
   control circuitry configured to provide memory backing for register operand data in a memory hierarchy, wherein the memory hierarchy includes:
      a data cache; and
      an operand cache between the processor pipeline circuitry and the data cache in the memory hierarchy; and
   lock circuitry configured to:
      control a first set of lock indicators for a set of registers for a first thread, including to assert one or more lock indicators for registers that are indicated as being utilized by instructions of the first thread;
      preserve register operand data in the data cache, including to prevent eviction of a given cache line from the data cache based on an asserted lock indicator for register data stored in the given cache line; and
      in response to a reset event:
         flush operand data to the memory hierarchy from one or more operand cache entries indicated as being last-use; and
         clear the first set of lock indicators.

2. The apparatus of claim 1, wherein the lock circuitry is further configured to, in response to the reset event:
   assert one or more lock indicators for the registers whose operand data was flushed from the one or more operand cache entries.

3. The apparatus of claim 2, wherein, to assert the one or more lock indicators for the registers whose operand data was flushed from the one or more operand cache entries, the lock circuitry is configured to control a second set of lock indicators for the set of registers.

4. The apparatus of claim 1, wherein the lock circuitry is further configured to, in response to the reset event:
   clear entries in the operand cache that are not indicated as being last-use.

5. The apparatus of claim 1, wherein indications of last-use for one or more operand cache entries are based on last-use hint information from a compiler.

6. The apparatus of claim 1, wherein the lock circuitry is configured to maintain lock indicators at single-instruction multiple-data (SIMD) granularity for threads in a SIMD group.

7. The apparatus of claim 1, further comprising:
   decode circuitry configured to decode instructions for execution and indicate the registers utilized by instructions of the first thread.

8. The apparatus of claim 1, wherein the lock circuitry is configured to switch between sets of lock indicators for the set of registers in response to the reset event.

9. The apparatus of claim 1, wherein the processor pipeline circuitry is configured to pipeline, at least through a schedule pipeline stage, information that identifies a set of lock indicators corresponding to a given operation.

10. The apparatus of claim 9, wherein the processor pipeline circuitry is configured to perform a fence operation in response to the reset event such that all operations that use the first set of lock indicators reach a pipeline stage before any operations that use a second set of lock indicators proceed past the pipeline stage.

11. The apparatus of claim 1, wherein the reset event corresponds to a threshold number of registers in the set of registers being locked.

12. The apparatus of claim 1, wherein the reset event corresponds to a compiler hint.

13. The apparatus of claim 1, wherein the reset event corresponds to a threshold number of stall cycles of the first thread in a pipeline stage.

14. A method, comprising:

storing, by a computing system in an operand cache, register operand data for operations performed by a processor pipeline of the computing system;

controlling, by the computing system, a first set of lock indicators for a set of registers for a first thread, including to assert one or more lock indicators for registers that are indicated as being utilized by instructions of the first thread;

preserving, by the computing system, register operand data in a data cache, including to prevent eviction of a given cache line from the data cache based on an asserted lock indicator for register data stored in the given cache line; and in response to a reset event, the computing system:

flushing operand data to the data cache from one or more entries of the operand cache indicated as being last-use; and clearing the first set of lock indicators.

15. The method of claim 14, further comprising, in response to the reset event:

asserting one or more lock indicators for the registers whose operand data was flushed from the one or more operand cache entries.

16. The method of claim 15, wherein the asserting includes controlling a second set of lock indicators for the set of registers.

17. The method of claim 14, further comprising, in response to the reset event:

clearing entries in the operand cache that are not indicated as being last-use.

18. An apparatus, comprising:

processor pipeline circuitry configured to perform operations on register operand data;

control circuitry configured to provide memory backing for register operand data in a memory hierarchy, wherein the memory hierarchy includes a data cache at a first cache level;

scoreboard circuitry configured to track which architectural registers are stored at the first cache level; and lock circuitry configured to:

initiate a map request to confirm whether operand data for registers that are indicated as being utilized by instructions of a first thread are stored at the first cache level;

in response to the scoreboard circuitry confirming that one or more registers utilized by instructions of the first thread are stored at the first cache level, control a first set of lock indicators for a set of registers for the first thread, including to assert one or more lock indicators corresponding to the confirmed one or more registers; and preserve register operand data in the data cache, including to prevent eviction of a given cache line from the data cache based on an asserted lock indicator for a register stored in the given cache line.

19. The apparatus of claim 18, wherein the lock circuitry is further configured to:

clear the first set of lock indicators in response to a reset event.

20. The apparatus of claim 18, further comprising:

control circuitry configured to, in response to the scoreboard circuitry confirming that a register utilized by an instruction of the first thread is not stored at the first cache level, initiate a fetch operation from the memory hierarchy to the first cache level.

\* \* \* \* \*